(12) United States Patent
Kim et al.

(10) Patent No.: US 11,376,927 B2
(45) Date of Patent: Jul. 5, 2022

(54) AIR VENT DEVICE FOR VEHICLE

(71) Applicants: Hyundai Motor Company, Seoul (KR); Kia Motors Corporation, Seoul (KR)

(72) Inventors: Yu Mi Kim, Gyeonggi-do (KR); Sang Ku Hur, Gyeonggi-do (KR); Jae Geun Jeong, Seoul (KR); Eung Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/101,455

(22) Filed: Nov. 23, 2020

(65) Prior Publication Data

US 2021/0300157 A1   Sep. 30, 2021

(30) Foreign Application Priority Data

Mar. 30, 2020 (KR) .......................... 10-2020-0038153

(51) Int. Cl.
   *B60H 1/34* (2006.01)
(52) U.S. Cl.
   CPC ... *B60H 1/3421* (2013.01); *B60H 2001/3471* (2013.01)
(58) Field of Classification Search
   CPC .......... B60H 1/3421; B60H 2001/3471; B60H 1/3414; B60H 1/28
   See application file for complete search history.

(56) References Cited

U.S. PATENT DOCUMENTS

| 10,005,341 B2 * | 6/2018 | Voigt | B60H 1/3421 |
| 2005/0098642 A1 * | 5/2005 | Ogawa | B60H 1/00985 237/12 |
| 2017/0232815 A1 * | 8/2017 | Deneau | B60H 1/00064 454/155 |

FOREIGN PATENT DOCUMENTS

| DE | 10061060 B4 * | 12/2012 | ........... B60H 1/3421 |
| DE | 102016105003 A1 * | 9/2016 | ........... B60H 1/3421 |
| WO | WO-2011089736 A1 * | 7/2011 | ........... B60H 1/3428 |

* cited by examiner

*Primary Examiner* — Steven S Anderson, II
(74) *Attorney, Agent, or Firm* — Fox Rothschild LLP; Peter F. Corless

(57) ABSTRACT

An air vent device for a vehicle includes a main vent and an auxiliary vent divided by a partition wall and combined in a single air duct, a plurality of horizontal wings mounted at positions behind the main vent and the auxiliary vent, and an air volume control wing included in the plurality of horizontal wings for distributing an air volume discharged into an interior of the vehicle through the main vent and an air volume discharged into the interior of the vehicle through the auxiliary vent. The air vent device is capable of securing an interior discharge air volume, adjusting a wind direction, securing an air duct installation space, and re-distributing a leakage amount of air.

11 Claims, 12 Drawing Sheets

FIG. 11

| ITEMS | | | |
|---|---|---|---|
| TEMPERATURE(°C) | 29.7 | 29.2 | 28.9 | ent device for a vehicle, more particularly, to the air vent device in which a main vent and an auxiliary vent are combined in a single air duct.

AIR VENT DEVICE FOR VEHICLE

CROSS-REFERENCE TO RELATED APPLICATION

This application claims under 35 U.S.C. § 119(a) the benefit of Korean Patent Application No. 10-2020-0038153 filed on Mar. 30, 2020, the entire contents of which are incorporated herein by reference.

BACKGROUND

(a) Technical Field

The present disclosure relates to an air vent device for a vehicle, more particularly, to the air vent device in which a main vent and an auxiliary vent are combined in a single air duct.

(b) Description of the Related Art

Generally, an air vent for a vehicle, which discharges air for heating and cooling generated due to operation of an air conditioning system to an interior of the vehicle, includes a center air vent mounted on a center fascia panel between front sides of a driver seat and a passenger seat, and a side vent mounted on front crash pads of the driver seat and the passenger seat.

Usually, one center air vent is mounted at each of a front right position of the driver seat and a front left position of the passenger seat, and one side vent is mounted at each of a front left position of the driver seat and a front right position of the passenger seat.

These air vents are manufactured in various forms for each vehicle type in consideration of a function of securing air volume and adjusting a wind direction as well as design factors.

Referring to FIG. 1 (RELATED ART), an arrangement in which an upper air vent 20 and a lower air vent 30 are vertically spaced apart from each other and mounted at an air discharge position of an air duct 10 may be applied as one form of the air vent device.

To this end, since the air duct 10 should be configured to branch into an upper duct 11 on which the upper air vent 20 is mounted and a lower duct 12 on which the lower air vent 30 is mounted, a size and a volume of the air duct 10 are inevitably increased so that there is a problem of a design constraint for securing an air duct installation space.

In addition, the upper air vent 20 and the lower air vent 30 should be separately provided in a total of eight or more, and parts such as wings, knobs, and dampers constituting the upper air vent 20 and the lower air vent 30 are separately required. Consequently, there is a problem that the number of parts of the entire air vent is increased, which may cause an increase in assembly man-hours and production cost.

SUMMARY

In one aspect, the present disclosure provides an air vent device for a vehicle, which is capable of easily securing an interior discharge air volume in terms of a function, smoothly adjusting a wind direction, minimizing occurrence of a design constraint so as to secure an air duct installation space, and improving quality of an air vent through distribution of a leakage amount of air, by configuring a main vent and an auxiliary vent in a single air duct.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides an air vent device for a vehicle, which includes an air duct; a partition wall mounted on an air discharge portion of the air duct and configured to divide the air discharge portion into a main vent and an auxiliary vent; a plurality of horizontal wings mounted at positions behind the main vent and auxiliary vent in an interior of the air duct to be vertically pivotable due to a manipulation of a main knob and configured to adjust a vertical wind direction of air; and an air volume control wing mounted included in (i.e., one of) the plurality of horizontal wings and configured to distribute an air volume discharged into the interior of a vehicle through the main vent and an air volume discharged into the interior of the vehicle through the auxiliary vent, wherein the air volume control wing includes a flat wing arranged parallel to the plurality of horizontal wings, and a guide wing bent downward to extend from a rear end portion of the flat wing at a predetermined angle.

The partition wall may be mounted to be closer to the auxiliary vent than the main vent in the air discharge portion of the air duct such that a size of the main vent may be formed to be larger than that of the auxiliary vent.

The air volume control wing may be located behind the partition wall and pivoted at an angle for discharging the air upward; when the air volume control wing is arranged in a horizontal state, the flat wing may be located at a position that is higher than that of the partition wall, and when the air volume control wing is pivoted at an angle for discharging the air downward, the flat wing may be located to face a rear distal end of the partition wall.

Preferably, when the plurality of horizontal wings including the air volume control wing are pivoted at an angle for discharging the air upward, a ratio of a length ranging from the distal rear end of the guide wing to a top surface of the air duct to a length ranging from the distal rear end of the guide wing to a bottom surface of the air duct may be set as a ratio of 95:5, and the plurality of horizontal wings including the air volume control wing may be pivoted upward at an angle of about 25° (±2°) so as to discharge the air upward in a horizontal arrangement state.

Preferably, when the plurality of horizontal wings including the air volume control wing are arranged in a horizontal state so as to discharge the air in a linear direction, a ratio of the length ranging from the distal rear end of the guide wing to the top surface of the air duct to a length ranging from the distal rear end of the guide wing to the bottom surface of the air duct may be set as a ratio of 80:20.

Preferably, when the plurality of horizontal wings including the air volume control wing are pivoted at an angle for discharging the air downward, a ratio of the length ranging from the distal rear end of the guide wing to the top surface of the air duct to a length ranging from the distal rear end of the guide wing to the bottom surface of the air duct may be set at a ratio of 65:35. The plurality of horizontal wings including the air volume control wing may be pivoted downward at an angle of about 25° (±2°) so as to discharge the air downward in the horizontal arrangement state.

A first nozzle cover on which the main knob is mounted may be installed at an outlet of the main vent, and a second nozzle cover on which a dummy knob is mounted may be installed at the auxiliary vent.

The main knob may include a knob body slidably mounted on the first nozzle cover, and a knob bar formed in a rear end portion of the knob body and connected to one among the plurality of horizontal wings.

The first nozzle cover may include a quadrangular external nozzle frame having pivot shafts which are formed on a top surface and a bottom surface of the external nozzle frame and engaged with an upper portion and a lower portion of the main vent; a quadrangular internal nozzle frame disposed to be spaced apart from an inner surface of the external nozzle frame; a plurality of connection bars configured to integrally connect the external nozzle frame to the internal nozzle frame; and a main knob mounting bar connected between an upper portion and a lower portion of the internal nozzle frame.

Preferably, front-rear lengths of an upper bar and a lower bar of the internal nozzle frame may be formed to be smaller than those of a left bar and a right bar of the internal nozzle frame so as to secure directionality of a vertical wind direction of the air.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 11 is a diagram showing results of measuring a cooling effect according to a front-rear length of the first nozzle cover in the configuration of the air vent device for a vehicle according to the present disclosure.

Figure 1:
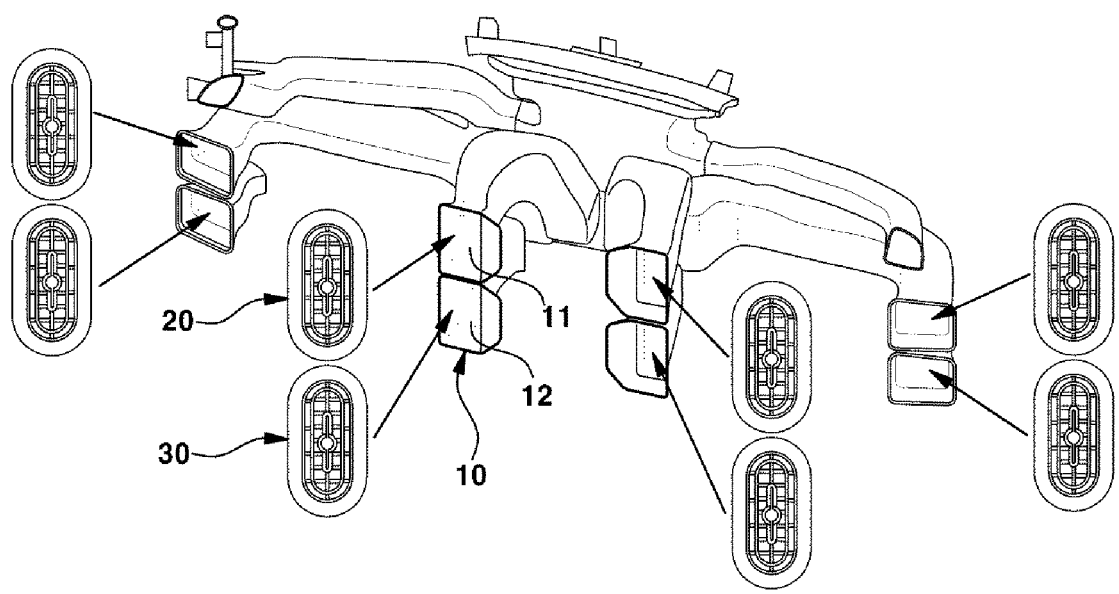
FIG. 1 (RELATED ART) is a schematic diagram illustrating a conventional air vent device including an upper air vent and a lower air vent.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

Figure 2:
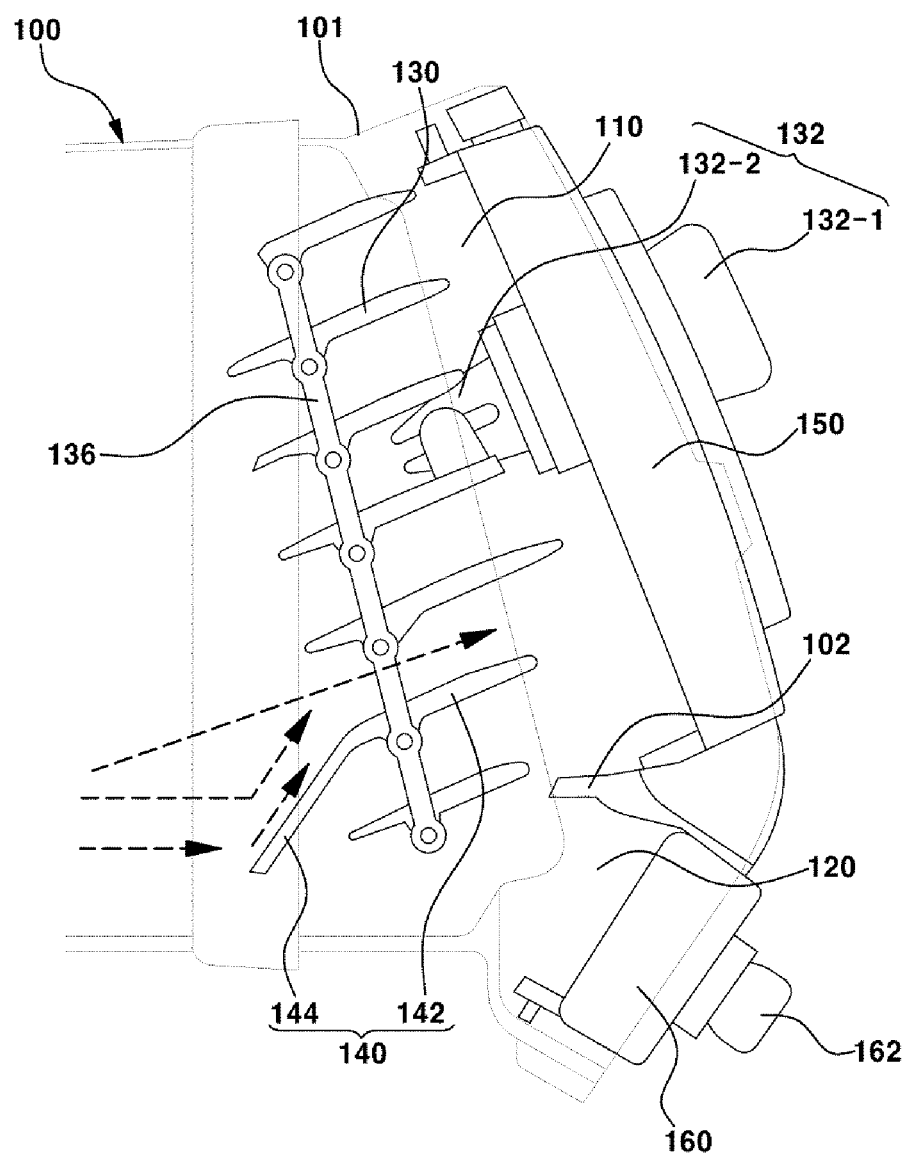
FIG. 2 is a side cross-sectional view illustrating an air vent device for a vehicle according to the present disclosure.

FIG. 2 is a side cross-sectional view illustrating an air vent device for a vehicle according to the present disclosure, and reference numeral 100 denotes an air duct.

The air duct 100 is a path through which air generated due to operation of an air conditioning device flows toward an interior of the vehicle and is formed in a single pipe structure.

In particular, a partition wall 102 is mounted in an air discharge portion 101 (a distal end portion of the air duct 100 extending toward the interior of the vehicle) in the air duct 100 and divides the air discharge portion 101 into a main vent 110 and an auxiliary vent 120.

For example, both side end portions of the partition wall 102 are mounted on a side wall of the air discharge portion 101 of the air duct 100 so that the main vent 110 and the auxiliary vent 120 may be divided into separate discharge spaces due to the partition wall 102.

The main vent 110 and auxiliary vent 120 may be arranged in a vertical direction or arranged in line with each other in a left-right direction.

Preferably, in order to form a size of the main vent 110 to be larger than that of the auxiliary vent 120, the partition wall 102 is mounted to be located closer to the auxiliary vent 120 than the main vent 110 in the air discharge portion 101 of the air duct 100.

A plurality of horizontal wings 130 for vertically adjusting a wind direction of air are arranged to be vertically pivoted at positions behind the main vent 110 and the auxiliary vent 120 in the air duct 100 due to operation of a main knob 132.

Figure 12:
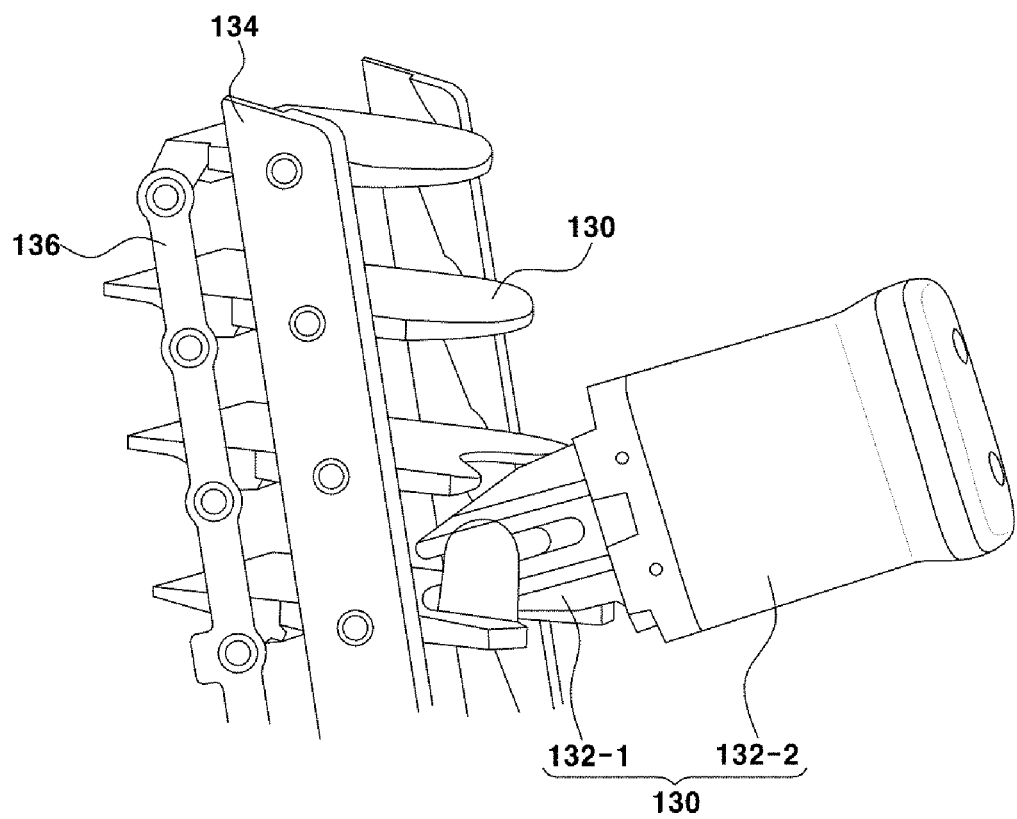
FIG. 12 is a schematic diagram illustrating a configuration for vertical pivoting of the plurality of horizontal wings including the air volume control wing in the configuration of the air vent device for a vehicle according to the present disclosure.

For example, as shown in FIG. 12, the plurality of horizontal wings 130 are pivotably hinge-coupled to a linkage 134, one connection link 136 is hinged-coupled to side rear end portions of the plurality of horizontal wings 130 to simultaneously pivot the plurality of horizontal wings 130, and the main knob 132 is connected to one among the plurality of horizontal wings 130.

Thus, since all the plurality of horizontal wings 130 are hinge-coupled to one connection link 136, when the main knob 132 is vertically manipulated, the plurality of horizontal wings 130 may be vertically pivoted about a hinge-coupled point of the linkage 134.

In particular, one of the plurality of horizontal wings 130 is adopted as an air volume control wing 140 which distributes an air volume discharged into the interior through the main vent 110 and an air volume discharged into the interior through the auxiliary vent 120.

To this end, the air volume control wing 140 includes a flat wing 142 disposed parallel to the plurality of horizontal wings 130, and a guide wing 144 bent downward from a rear end portion of the flat wing 142 at a predetermined angle to extend therefrom.

In this case, the air volume control wing 140 is vertically pivotably located behind the partition wall 102.

Thus, when the air volume control wing 140 is pivoted at an angle for discharging air upward, the flat wing 142 of the air volume control wing 140 is arranged to be inclined upward at a position that is higher than that of the partition wall 102, and simultaneously, the guide wing 144 is arranged at a position that is lower than that of the partition wall 102 so that the air may be mainly guided toward the main vent 110.

Meanwhile, when the air volume control wing 140 is pivoted at an angle for discharging the air downward, the flat wing 142 of the air volume control wing 140 is arranged at a position facing a rear end of the partition wall 102, and simultaneously, the guide wing 144 is arranged at a position that is higher than that of the partition wall 102 so that an air volume guided toward the auxiliary vent 120 may be increased.

Figure 10:
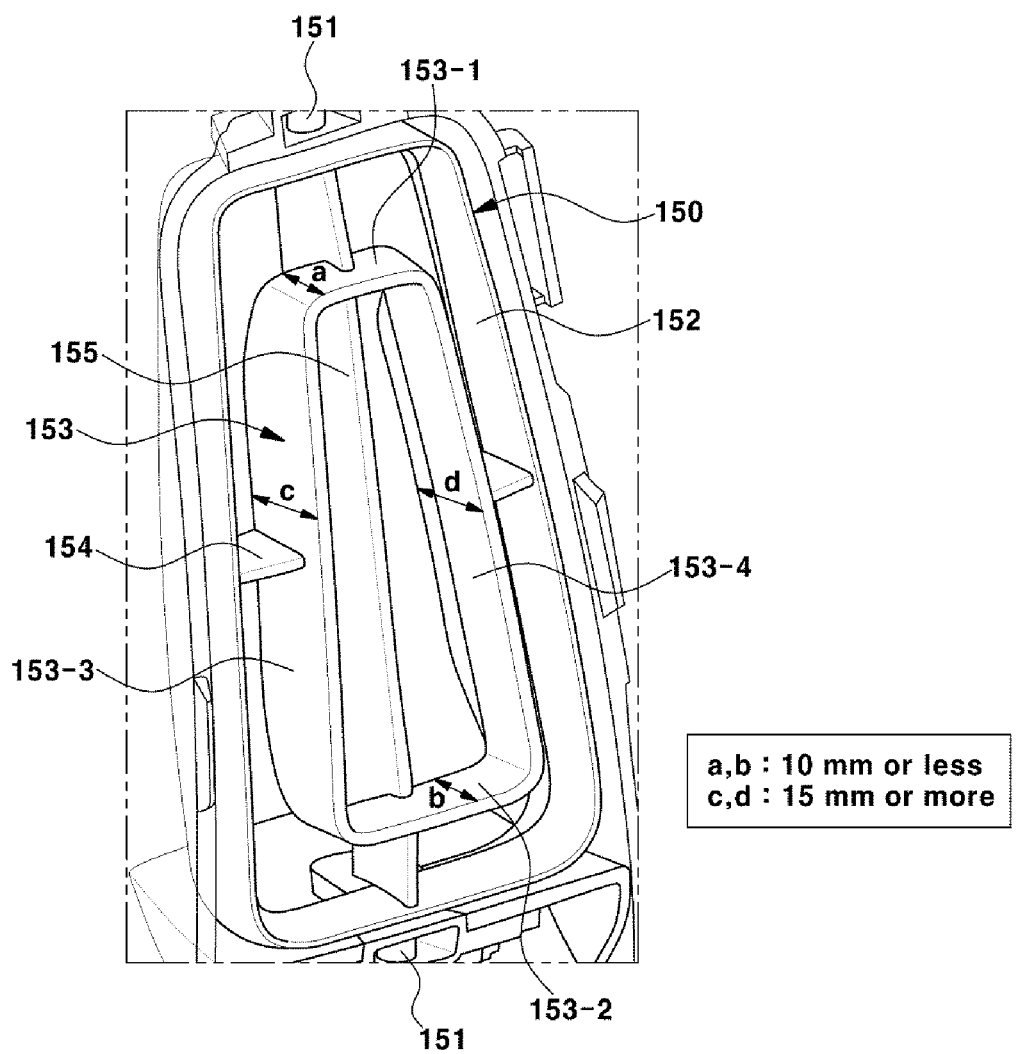
FIG. 10 is a perspective view illustrating a first nozzle cover of the configuration of the air vent device for a vehicle according to the present disclosure.

Referring to FIG. 10, a first nozzle cover 150 on which the main knob 132 is mounted is mounted at an outlet of the main vent 110 to be pivotable in the left-right direction, and a second nozzle cover 160 on which a dummy knob 162 is mounted is fixedly mounted on the auxiliary vent 120.

Preferably, as shown in FIG. 10, the first nozzle cover 150 includes a quadrangular external nozzle frame 152 having pivot shafts 151 which are formed on a top surface and a bottom surface of the external nozzle frame 152 and engaged with an upper portion and a lower portion of the main vent 110, a quadrangular internal nozzle frame 153 disposed to be spaced apart from an inner surface of the external nozzle frame 152, a plurality of connection bars 154 configured to integrally connect between the external nozzle frame 152 and the internal nozzle frame 153, and a main knob mounting bar 155 connected between an upper bar 153-1 and a lower bar 153-2 of the internal nozzle frame 153.

Thus, when a user holds and moves the main knob 132 mounted on the main knob mounting bar 155 to a left side or a right side, the first nozzle cover 150 is pivoted to the left side or the right side about the pivot shafts 151 so that an interior discharge wind direction of the air may be adjusted in a left direction or a right direction.

In this case, a left bar 153-3 and a right bar 153-4 of the internal nozzle frame 153 of the first nozzle cover 150 guide the interior discharge wind direction of the air in the left direction or the right direction, and simultaneously, serve to secure directionality of a wind direction of the air in a left-right direction.

To this end, in order to ensure a function of guiding a left-right wind direction of air and secure directionality of the left-right wind direction of the air, front-rear lengths of the left-bar 153-3 and the right bar 153-4 of the internal nozzle frame 153 (portions indicated as c and d in FIG. 10) may each be formed to have 15 mm or more, but it is preferable to form each of the front-rear lengths to have 15 mm in consideration of an assembly space of the first nozzle cover 150.

Meanwhile, since the interior discharge wind direction of the air is adjusted upward or downward due to the plurality of horizontal wings 130 including the air volume control wing 140, the upper bar 153-1 and the lower bar 153-2 of the internal nozzle frame 153 serve as resistance degrading directionality of a vertical wind direction of the air.

Figure 11:
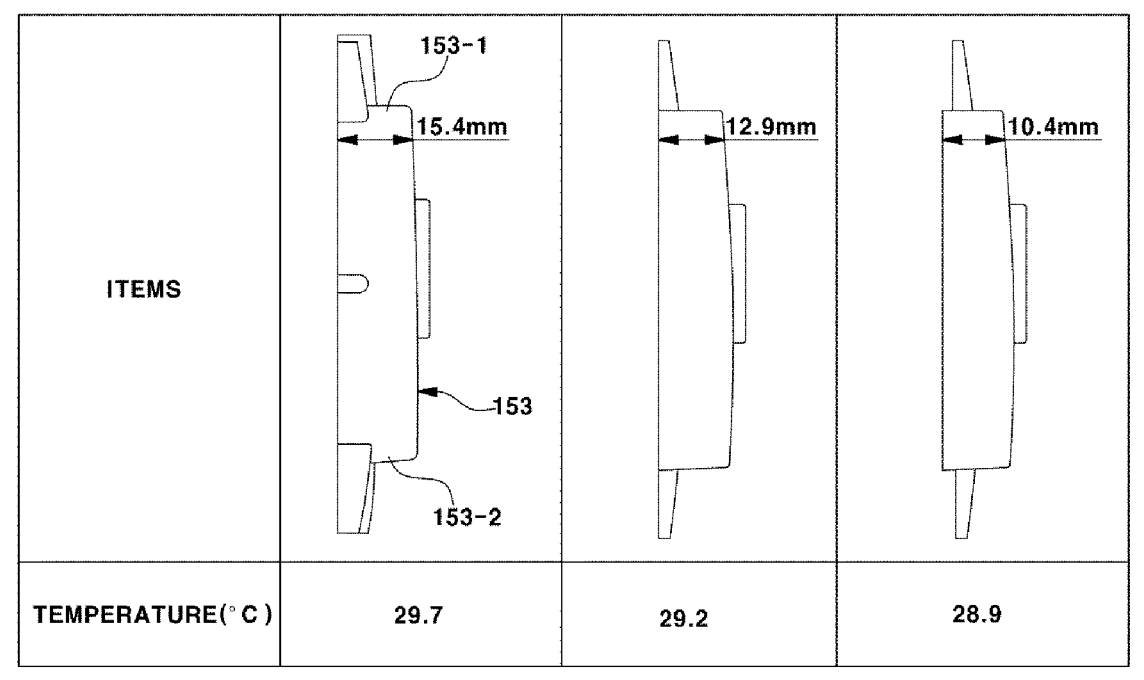

In order to solve the above problem, the front-rear lengths of the upper bar 153-1 and the lower bar 153-2 of the internal nozzle frame 153 (portions indicated as a and b in FIG. 10) are formed to be smaller than those of the left bar 153-3 and the right bar 153-4 of the internal nozzle frame 153 so as to secure the directionality of the vertical wind direction of the air. Referring to FIG. 11, the front-rear lengths of each of the upper bar 153-1 and the lower bar 153-2 of the internal nozzle frame 153 constituting the first nozzle cover 150 were formed to have 15.4 mm, 12.9 mm, and 10.4 mm, respectively, the same air volume passed through the first nozzle cover 150, and then a cooling influence test was performed to measure an interior temperature of a vehicle. As a result, it can confirmed that the larger the front-rear lengths of the upper bar 153-1 and the lower bar 153-2 of the internal nozzle frame 153, the higher the interior temperature was measured.

These test results demonstrate that the front-rear lengths of the upper bar 153-1 and the lower bar 153-2 of the internal nozzle frame 153 affect the interior cooling of the vehicle.

Thus, in order to secure the directionality of the vertical wind direction of the air, the front-rear lengths of the upper bar 153-1 and the lower bar 153-2 of the internal nozzle frame 153 (the portions indicated as a and b in FIG. 10) may be each formed to have 10 mm or less, but it is preferable to form each of the front-rear lengths to have 10 mm in consideration of the assembly space of the first nozzle cover 150.

Here, an operation flow for the air vent device having the above configuration according to the present disclosure will be described as flows.

Adjustment of Upward Wind Direction of Air

Figure 3:
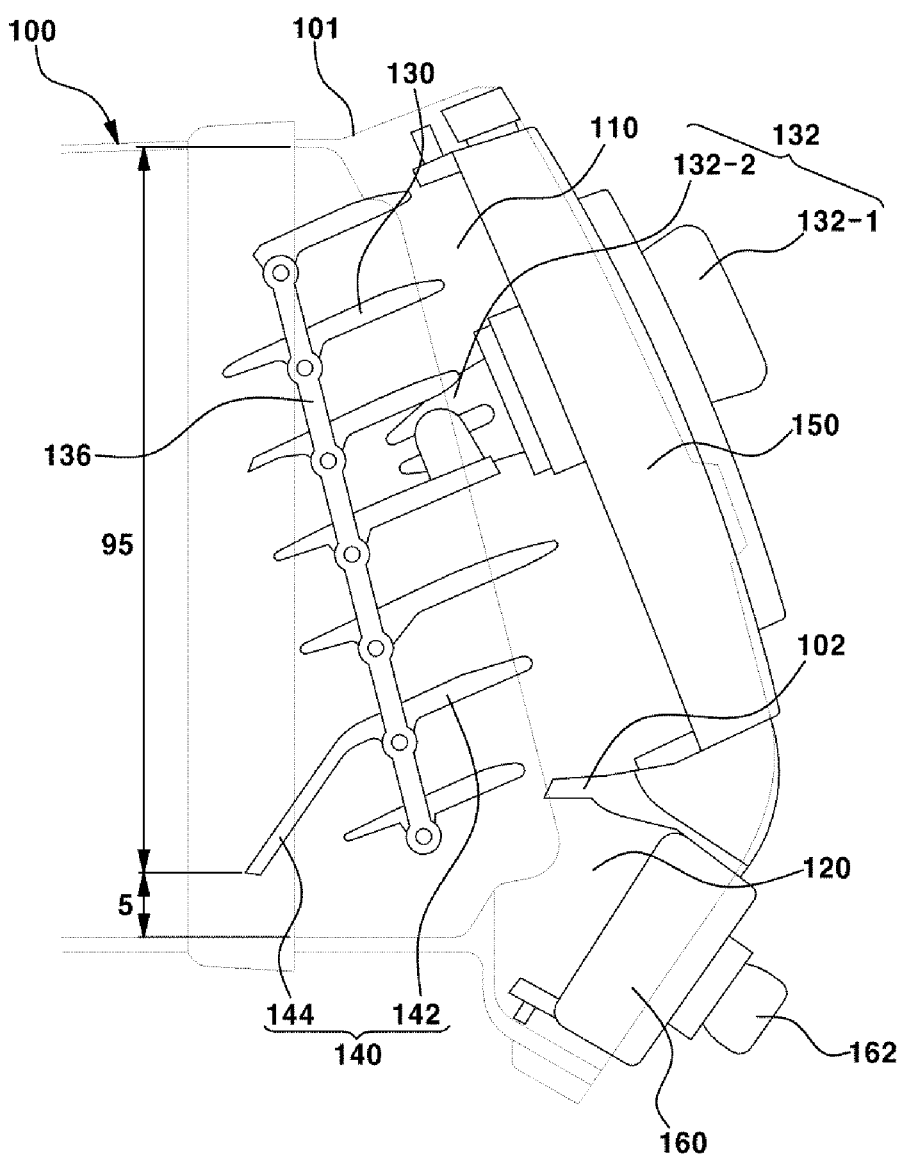
FIG. 3 is a side cross-sectional view illustrating a state in which the air vent device for a vehicle according to the present disclosure is operated to adjust an interior discharge direction of air to an upward direction.
Figure 6:
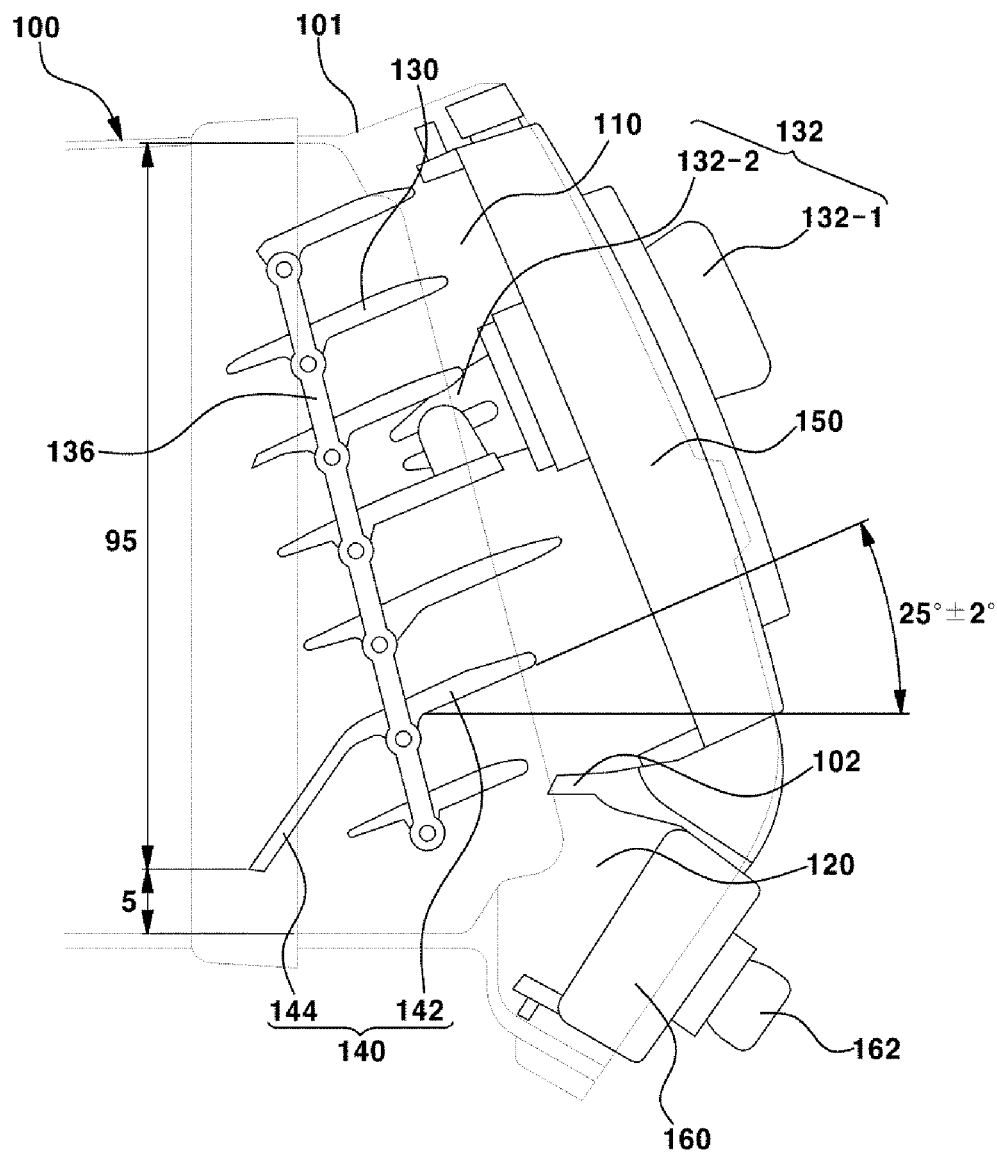
FIG. 6 is a side cross-sectional view illustrating upward pivot angles of a plurality of horizontal wings and an air volume control wing so as to adjust the interior discharge direction of the air to the upward direction in the air vent device for a vehicle according to the present disclosure.

FIG. 3 is a side cross-sectional view illustrating a state in which the air vent device for a vehicle according to the present disclosure is operated to adjust an interior discharge direction of air to an upward direction, and FIG. 6 is a side cross-sectional view illustrating upward pivot angles of the plurality of horizontal wings including the air volume control wing so as to adjust the interior discharge direction of the air to the upward direction.

First, as described above with reference to FIG. 12, when a user manipulates the main knob 132 upward, since all the plurality of horizontal wings 130 are hinge-coupled to one connection link 136, the plurality of horizontal wings 130 may be pivoted upward about the hinge-coupled point of the linkage 134.

In this case, the main knob 132 includes a knob body 132-1 slidably mounted on the first nozzle cover 150, and a knob bar 132-2 formed on a rear end portion of the knob body 132-1 and connected to one among the plurality of horizontal wings 130.

Thus, when the user holds and moves the knob body 132-1 of the main knob 132 upward, the knob bar 132-2 is also moved upward, and simultaneously, the horizontal wing 130 connected to the knob bar 132-2 as well as the remaining horizontal wings 130 including the air volume control wing 140 are pivoted upward.

In addition, when the air volume control wing 140 is pivoted downward at an angle for discharging the air upward, the flat wing 142 of the air volume control wing 140 is arranged to be inclined upward at a position that is higher than that of the partition wall 102, and simultaneously, the guide wing 144 is arranged at a position that is lower than that of the partition wall 102, so that the air may be mainly guided toward the main vent 110.

Thus, as shown in FIG. 3, when the plurality of horizontal wings 130 including the air volume control wing 140 are pivoted upward at angles for discharging the air upward, a ratio of a length ranging from a rear distal end of the guide wing 144 of the air volume control wing 140 to a top surface of the air duct 100 to a length ranging from the rear distal end of the guide wing 144 to a bottom surface of the air duct 100 is set as a ratio of 95:5 so that the air may be mainly guided to the main vent 110.

In addition, as shown in FIG. 6, the plurality of horizontal wings 130 including the air volume control wing 140 become a state of being pivoted upward at an angle of about 25° (±2°) so as to discharge the air upward in a horizontal arrangement state.

Thus, when the air generated due to the operation of the air conditioning device flows toward the interior along the air duct 100, the air may be guided upward due to the guide wing 144 and then pass through the main vent 110 and the auxiliary vent 120, thereby being discharged toward an upward direction of the interior.

In this case, a ratio of the length ranging from the rear distal end of the guide wing 144 of the air volume control wing 140 to the top surface of the air duct 100 to the length ranging from the rear distal end of the guide wing 144 to the bottom surface of the air duct 100 is set as a ratio of 95:5. Consequently, as indicated by arrows in FIG. 2, the air flowing in a lower space of the air duct 100 further flows toward the main vent 110 due to the guidance of the guide wing 144 so that an air volume passing through the main vent 110 to be discharged toward the upward direction of the interior and an air volume passing through the auxiliary vent 120 to be discharged into the interior may be distributed at a ratio of 95:5.

Accordingly, it is possible to obtain an effect in that most of the air volume passing through the main vent 110 to be discharged toward the upward direction of the interior may cool or heat an upper space of the interior, and some of the air volume passing through the auxiliary vent 120 to be discharged into the interior may cool or heat even a lower space of the interior. Therefore, it is possible to reduce deviation in heating and cooling between the upper space and the lower space of the interior.

Adjustment of Neutral (Linear) Wind Direction of Air

Figure 4:
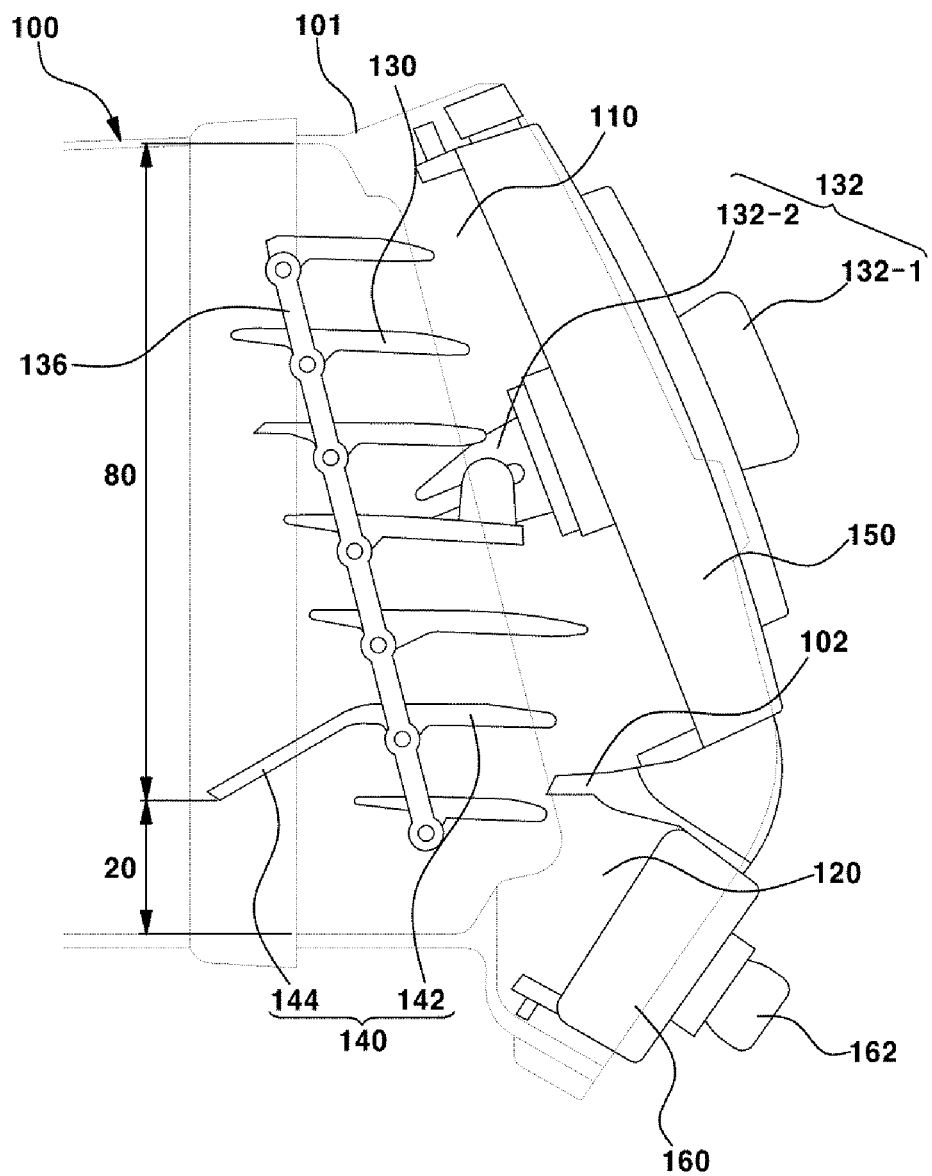
FIG. 4 is a side cross-sectional view illustrating a state in which the air vent device for a vehicle according to the present disclosure is operated to adjust the interior discharge direction of the air to a linear direction (neutral direction)

FIG. 4 is a side cross-sectional view illustrating a state in which the air vent device for a vehicle according to the present disclosure is operated to adjust the interior discharge direction of the air to a linear direction (neutral direction).

Figure 5:
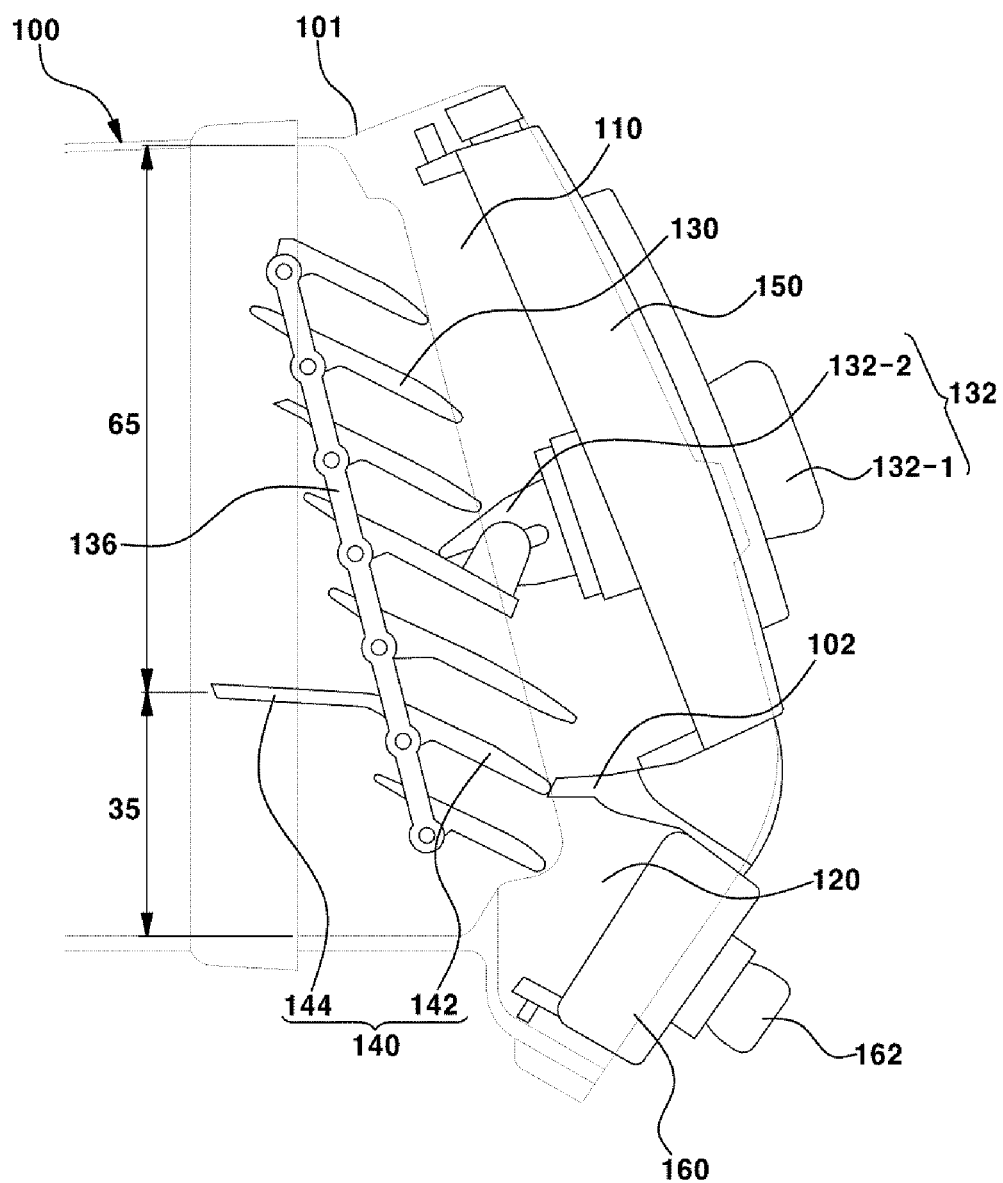
FIG. 5 is a side cross-sectional view illustrating a state in which the air vent device for a vehicle according to the present disclosure is operated to adjust the interior discharge direction of the air to a downward direction.

As shown in FIG. 5, when the main knob 132 is located at a neutral position, the plurality of horizontal wings 130 and the flat wing 142 of the air volume control wing 140 are arranged in a horizontal state so as to discharge the air in a linear direction.

In this case, as shown in FIG. 4, a ratio of the length ranging from the rear distal end of the guide wing 144 of the air volume control wing 140 to the top surface of the air duct 100 to the length ranging from the rear distal end of the guide wing 144 to the bottom surface of the air duct 100 is set as a ratio of 80:20.

Thus, when the air generated due to the operation of the air conditioning device flows toward the interior along the air duct 100, the air may be guided in the linear direction due to the guide wing 144 and the flat wing 142 of the air volume control wing 140, which are horizontally arranged, and then pass through the main vent 110 and the auxiliary vent 120, thereby being discharged toward the upward direction of the interior.

In this case, a ratio of the length ranging from the rear distal end of the guide wing 144 of the air volume control wing 140 to the top surface of the air duct 100 to the length ranging from the rear distal end of the guide wing 144 to the bottom surface of the air duct 100 is set as a ratio of 80:20. Consequently, the air flowing in a lower space of the air duct 100 further flows toward the main vent 110 due to the guidance of the guide wing 144 so that an air volume passing through the main vent 110 to be discharged toward the linear direction of the interior and an air volume passing through the auxiliary vent 120 to be discharged into the interior may be distributed at a ratio of 80:20.

Similarly, an entirety of the interior may be cooled or heated due to most of the air volume passing through the main vent 110 to be discharged toward the linear direction of the interior, and some of the air volume passing through the auxiliary vent 120 to be discharged into the interior may cool or heat even the lower space of the interior. Therefore, it is possible to reduce deviation in heating and cooling between the lower space of the interior and the upper space and an intermediate space of the interior.

Adjustment of Downward Wind Direction of Air

Figure 7:
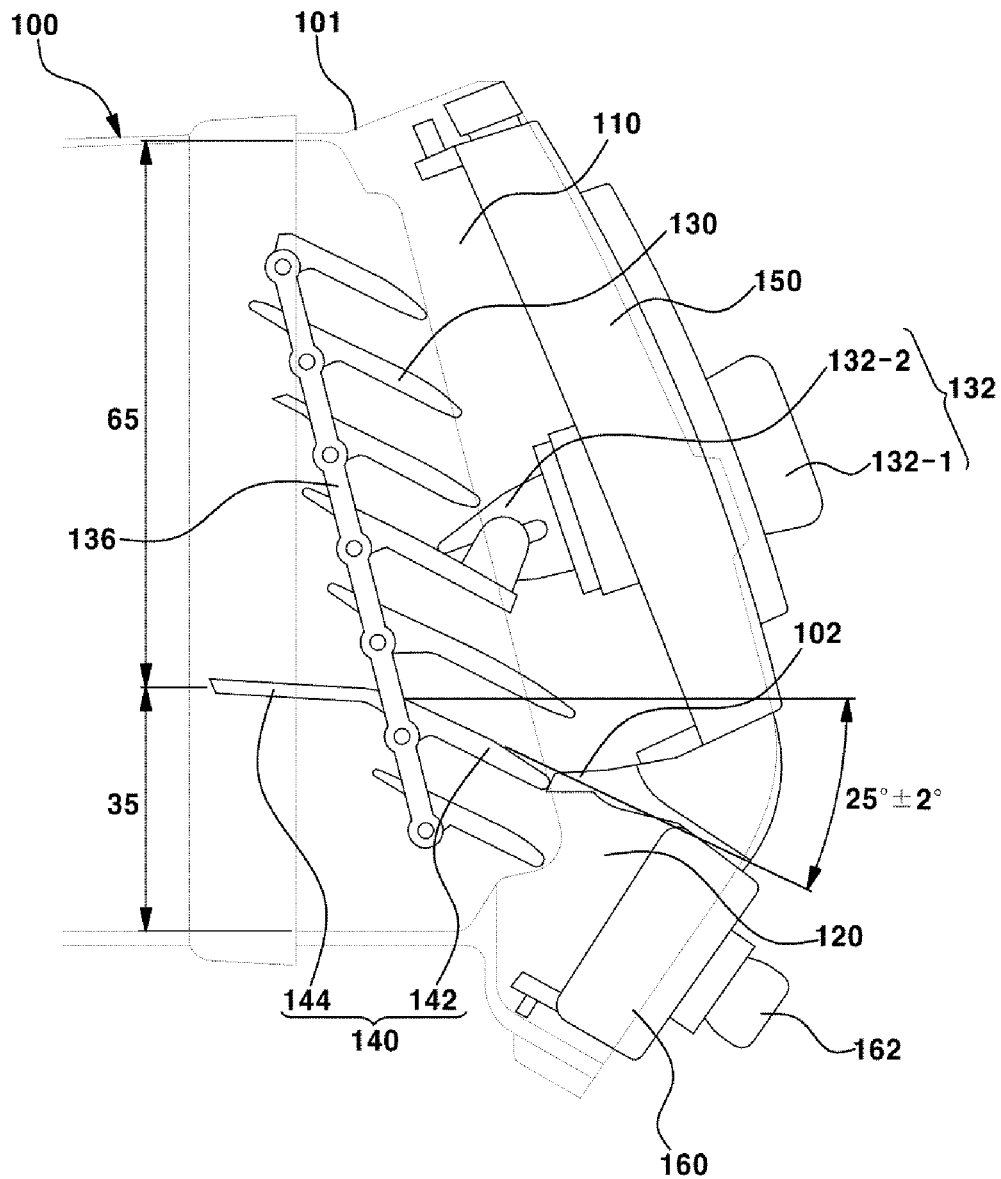
FIG. 7 is a side cross-sectional view illustrating downward pivot angles of the plurality of horizontal wings including the air volume control wing so as to adjust the interior discharge direction of the air to the downward direction in the air vent device for a vehicle according to the present disclosure.

FIG. 5 is a side cross-sectional view illustrating a state in which the air vent device for a vehicle according to the present disclosure is operated to adjust the interior discharge direction of the air to a downward direction, and FIG. 7 is a side cross-sectional view illustrating downward pivot angles of the plurality of horizontal wings including the air volume control wing so as to adjust the interior discharge direction of the air to the downward direction in the air vent device for a vehicle according to the present disclosure.

First, as described above with reference to FIG. 12, when a user manipulates the main knob 132 downward, since all the plurality of horizontal wings 130 are hinge-coupled to one connection link 136, the plurality of horizontal wings 130 may be pivoted downward about the hinge-coupled point of the linkage 134.

Thus, when the user holds and moves the knob body 132-1 of the main knob 132 downward, the knob bar 132-2 is also moved downward, and simultaneously, the horizontal wing 130 connected to the knob bar 132-2 as well as the remaining horizontal wings 130 including the air volume control wing 140 are pivoted downward.

In addition, when the air volume control wing 140 is pivoted downward at an angle for discharging the air downward, the flat wing 142 of the air volume control wing 140 is arranged at a position facing the rear end of the partition wall 102, and simultaneously, the guide wing 144 is arranged at a position that is higher than that of the partition wall 102, so that an air volume guided toward the auxiliary vent 120 may be increased.

Thus, as shown in FIG. 5, when the plurality of horizontal wings 130 including the air volume control wing 140 are pivoted downward at angles for discharging the air downward, a ratio of the length ranging from the rear distal end of the guide wing 144 of the air volume control wing 140 to the top surface of the air duct 100 to the length ranging from the rear distal end of the guide wing 144 to the bottom surface of the air duct 100 is set as a ratio of 65:35.

In addition, as shown in FIG. 7, the plurality of horizontal wings 130 including the air volume control wing 140 become a state of being pivoted downward at an angle of about 25° (±2°) so as to discharge the air downward in the horizontal arrangement state.

Thus, when the air generated due to the operation of the air conditioning device flows toward the interior along the air duct 100, the air may be guided downward due to the guide wing 144 and then pass through the main vent 110 and the auxiliary vent 120, thereby being discharged toward a downward direction of the interior.

In this case, a ratio of the length ranging from the rear distal end of the guide wing 144 of the air volume control wing 140 to the top surface of the air duct 100 to the length ranging from the rear distal end of the guide wing 144 to the bottom surface of the air duct 100 is set as a ratio of 65:35. Thus, the air volume passing through the main vent 110 to be discharged toward the upward direction of the interior including the air volume passing through the auxiliary vent 120 to be discharged into the interior may be distributed at a ratio of 65:35.

Accordingly, it is possible to obtain an effect in that most of the air volume passing through the main vent 110 to be discharged toward the downward direction of the interior may cool or heat the intermediate space and the lower space of the interior, and some of the air volume passing through the auxiliary vent 120 to be discharged into the interior may further cool or heat the lower space of the interior.

Figure 8:
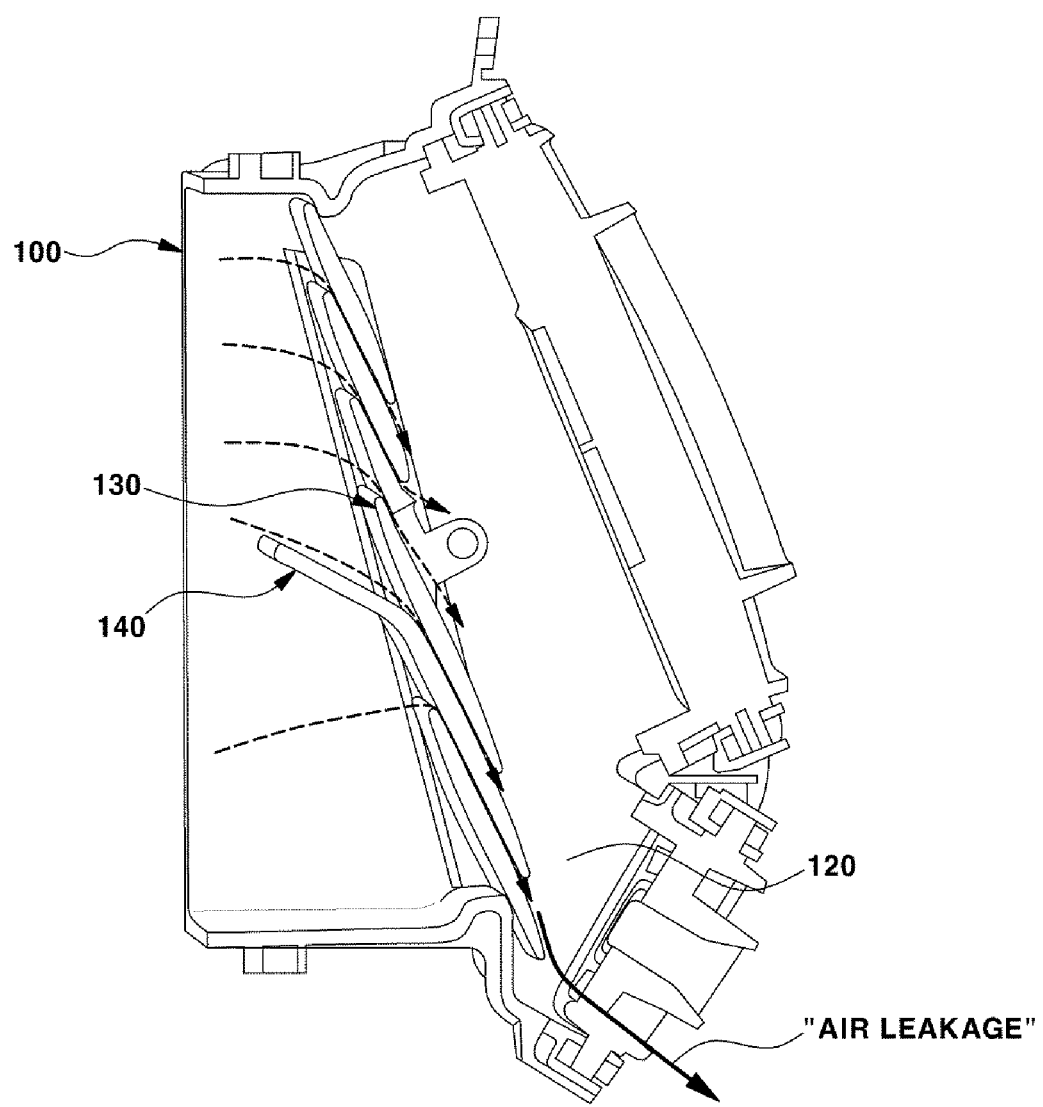
FIG. 8 is a schematic diagram illustrating a flow direction of a leakage amount of air when a partition wall is not present in a configuration of the air vent device for a vehicle according to the present disclosure.
Figure 9:
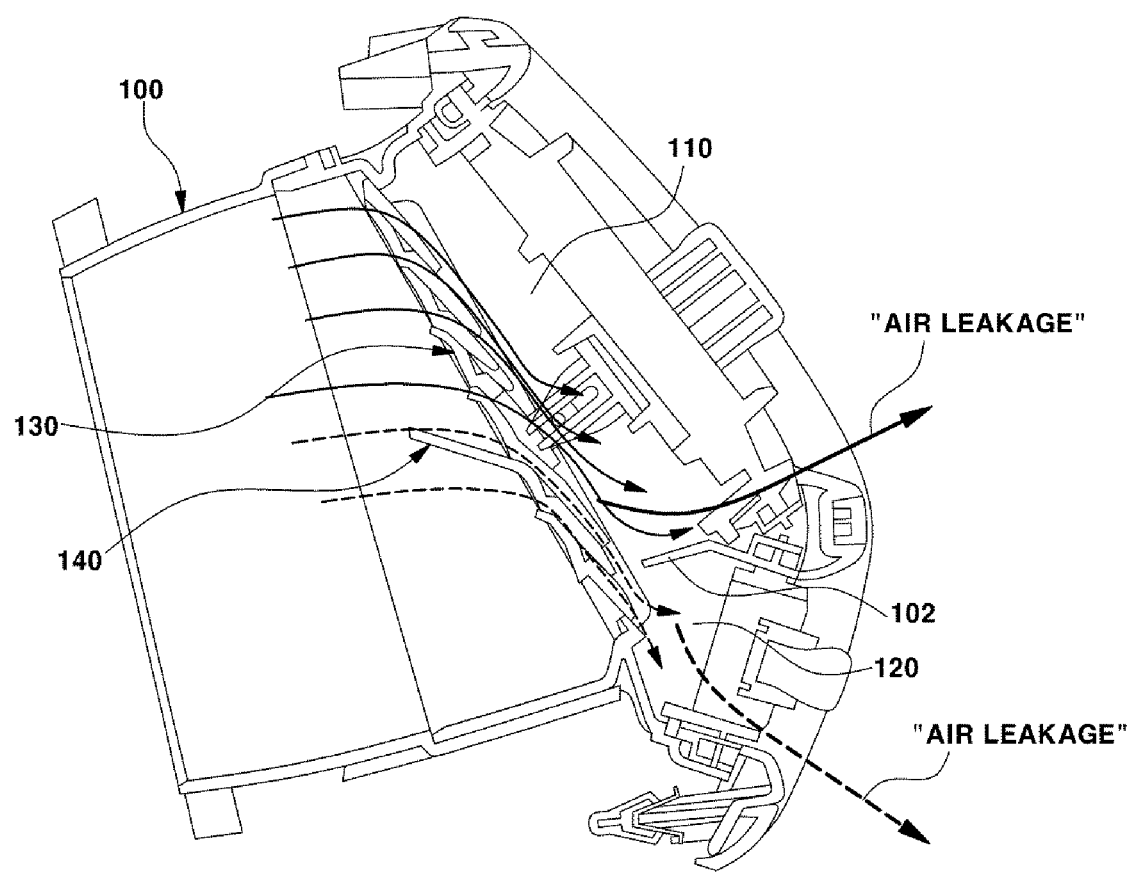
FIG. 9 is a side cross-sectional view illustrating the leakage amount of the air which is distributed to flow due to the partition wall of the configuration of the air vent device for a vehicle according to the present disclosure.

Meanwhile, as shown in FIGS. 8 and 9, when the user maximally moves the main knob 132 downward so as to block the air from being discharged into the interior, the plurality of horizontal wings 130 including the air volume control wing 140 may be pivoted downward at a maximum angle to become a state in which the plurality of horizontal wings 130 including the air volume control wing 140 are pressed against each other so that the air may be blocked from being discharged into the interior.

However, even when the plurality of horizontal wings 130 including the air volume control wing 140 become the state of being pressed against each other so as to block the air, an air leakage toward the interior may occur through gaps among the plurality of horizontal wings 130 including the air volume control wing 140.

In this case, as shown in FIG. 8, when the partition wall 102 which divides the main vent 110 from the auxiliary vent 120 is not present, in a state in which the plurality of horizontal wings 130 including the air volume control wing 140 are pivoted downward at the maximum angle to be pressed against each other, a leakage amount of the air is intensively excessively discharged through the auxiliary vent 120 so that the driver and the passenger may feel discomfort.

On the other hand, as shown in FIG. 9, when the partition wall 102 which divides the main vent 110 from the auxiliary vent 120 is present, in the state in which the plurality of horizontal wings 130 including the air volume control wing 140 are pivoted downward at the maximum angle to be pressed against each other, a part of the leakage amount of the air is discharged into the interior through the main vent 110 along an upper surface of the partition wall 102, and simultaneously, the remaining part of the leakage amount of the air is discharged into the interior through the auxiliary vent 120. Therefore, the leakage amount of the air may be distributed and discharged through the main vent 110 and the auxiliary vent 120, thereby avoiding discomfort to the driver and/or passenger(s).

The present disclosure provides the following effects through the above-described problem solving means.

First, a main vent and an auxiliary vent, which are divided by a partition wall, are formed in an air discharge portion of a single air duct, and thus air is discharged into an interior of a vehicle through the main vent and the auxiliary vent so that an air volume being discharged into the interior can be easily increased, and simultaneously, the air volume can be uniformly distributed into the interior.

Second, a vertical wind direction of the air can be smoothly adjusted due to a plurality of horizontal wings and an air volume control wing, and an upward distributed air volume and a downward distributed air volume of the air, which are discharged into the interior due to the air volume control wing, can be appropriately adjusted.

Third, in the related art, in order to separately form an upper air vent and a lower air vent, an air duct is formed in a dual structure which branches into an upper duct and a lower duct, so that a design constraint for securing an air duct installation space occurs. However, unlike the related art, according to the present disclosure, a main vent and an auxiliary vent are formed in a single air duct so that it is possible to minimize occurrence of a design constraint for securing an air duct installation space and implement reduction in the number of parts and production cost.

Fourth, even when the plurality of horizontal wings are maximally pivoted downward to become a closed state, an air leakage occurs. Thus, in a state in which the partition wall for dividing the main vent from the auxiliary vent is not present, a leakage amount of the air is intensively excessively discharged through the auxiliary vent so that a driver and a passenger may feel discomfort. Unlike the above description, when the partition wall for dividing the main vent from the auxiliary vent is present, the leakage amount of the air can be distributed and discharged through the main vent and the auxiliary vent so that it is possible to avoid discomfort of the driver and any passenger(s).

Fifth, in a configuration of a first nozzle cover for covering the main vent, front-rear lengths of an upper bar and a lower bar of an internal nozzle frame are formed to be smaller than those of a left bar and a right bar of the internal nozzle frame so that directionality of a vertical wind direction of the air can be easily secured.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, may further fall within the scope of the present disclosure.

What is claimed is:

1. An air vent device for a vehicle, comprising:
an air duct being a single passage where air flows;
a partition wall mounted on an air discharge portion of the air duct and configured to divide the air discharge portion into a main vent and an auxiliary vent;
a plurality of horizontal wings disposed upstream of the partition wall with respect to a flow path of the air in an interior of the air duct, the plurality of horizontal wings being vertically pivotable together due to manipulation of a main knob and configured to adjust a vertical wind direction of air; and
an air volume control wing included in the plurality of horizontal wings and configured to distribute an air volume discharged into an interior of the vehicle through the main vent and an air volume discharged into the interior of the vehicle through the auxiliary vent,
wherein the air volume control wing includes a flat wing arranged parallel to other horizontal wings of the plurality of horizontal wings, and a guide wing bent downward to extend from a rear end portion of the flat wing at a predetermined angle,
wherein the partition wall is mounted to be closer to the auxiliary vent than the main vent in the air discharge portion of the air duct such that a size of the main vent is formed to be larger than that of the auxiliary vent, and a distance between a distal rear end of the guide wing and a top of the air duct is greater than a distance between the distal rear end of the guide wing and a bottom of the air duct, and
wherein the guide wing partially blocks air flow through the auxiliary vent when the horizontal wings are rotated in a first direction, and the guide wing is disposed substantially parallel with the air duct and above the partition wall when the horizontal wings are fully rotated in a second direction, the second direction being opposite to the first direction.

2. The air vent device of claim 1, wherein:
the air volume control wing is located behind the partition wall and pivoted at an angle for discharging the air upward;
when the air volume control wing is arranged in a horizontal state, the flat wing is located at a position that is higher than that of the partition wall; and
when the air volume control wing is pivoted at an angle for discharging the air downward, the flat wing is located to face a rear distal end of the partition wall.

3. The air vent device of claim 1, wherein when the plurality of horizontal wings including the air volume control wing are pivoted at an angle for discharging the air upward, a ratio of a length ranging from a distal rear end of the guide wing to a top surface of the air duct to a length ranging from the distal rear end of the guide wing to a bottom surface of the air duct is set as a ratio of 95:5.

4. The air vent device of claim 3, wherein the plurality of horizontal wings including the air volume control wing are pivoted upward at an angle of about 25° so as to discharge the air upward in a horizontal arrangement state.

5. The air vent device of claim 1, wherein when the plurality of horizontal wings including the air volume control wing are arranged in a horizontal state so as to discharge the air in a linear direction, a ratio of a length ranging from a distal rear end of the guide wing to atop surface of the air duct to a length ranging from the distal rear end of the guide wing to a bottom surface of the air duct is set as a ratio of 80:20.

6. The air vent device of claim 1, wherein when the plurality of horizontal wings including the air volume control wing are pivoted at an angle for discharging the air downward, a ratio of a length ranging from a distal rear end of the guide wing to atop surface of the air duct to a length ranging from the distal rear end of the guide wing to a bottom surface of the air duct is set at a ratio of 65:35.

7. The air vent device of claim 6, wherein the plurality of horizontal wings including the air volume control wing are pivoted downward at an angle of about 25° so as to discharge the air downward in a horizontal arrangement state.

8. The air vent device of claim 1, wherein a first nozzle cover on which the main knob is mounted is installed at an outlet of the main vent, and a second nozzle cover on which a dummy knob is mounted is installed at the auxiliary vent.

9. The air vent device of claim 8, wherein the main knob includes a knob body slidably mounted on the first nozzle cover, and a knob bar formed in a rear end portion of the knob body and connected to one among the plurality of horizontal wings.

10. The air vent device of claim 8, wherein the first nozzle cover includes:
a quadrangular external nozzle frame having pivot shafts which are formed on a top surface and a bottom surface of the external nozzle frame and engaged with an upper portion and a lower portion of the main vent;
a quadrangular internal nozzle frame disposed to be spaced apart from an inner surface of the external nozzle frame;
a plurality of connection bars configured to integrally connect the external nozzle frame to the internal nozzle frame; and
a main knob mounting bar connected between an upper portion and a lower portion of the internal nozzle frame.

11. The air vent device of claim 10, wherein front-rear lengths of an upper bar and a lower bar of the internal nozzle frame are formed to be smaller than those of a left bar and a right bar of the internal nozzle frame so as to secure directionality of a vertical wind direction of the air.

\* \* \* \* \*